United States Patent [19]
Hunt

[11] 3,810,454
[45] May 14, 1974

[54] POLLUTION FREE FUEL INLET SYSTEM FOR INTERNAL COMBUSTION ENGINES

[76] Inventor: John Hunt, 8030 S.E. Barbara Welch Rd., Portland, Oreg. 97236

[22] Filed: Sept. 25, 1972

[21] Appl. No.: 291,985

[52] U.S. Cl............. 123/142, 123/119 D, 123/124, 123/52 MF
[51] Int. Cl...................... F02m 17/00, F02m 23/04
[58] Field of Search.... 123/142, 119 D, 127, 119 B, 123/124 R, 52 MP, 141, 119 DB

[56] References Cited
UNITED STATES PATENTS

| | | | |
|---|---|---|---|
| 1,733,975 | 10/1929 | Osterhout | 123/142 |
| 3,664,316 | 5/1972 | Garcea | 123/124 R |
| 3,677,240 | 7/1972 | Sarto | 123/119 B |
| 1,614,544 | 1/1927 | Criqui et al. | 123/142 |

FOREIGN PATENTS OR APPLICATIONS 421,011  5/1947  Italy

Primary Examiner—Wendell E. Burns
Attorney, Agent, or Firm—Eugene M. Eckelman

[57] ABSTRACT

A reed valve is provided between the intake manifold of an internal combustion engine and the combustion chamber, allowing flow of air fuel mixture from the manifold into the combustion chamber and preventing backflow. An air inlet from an outside source is provided on the combustion chamber side of the reed valve, thus allowing free flow of an auxiliary supply of air under vacuum conditions into the combustion chamber. A valve is provided in the air inlet means to control the amount of auxiliary air flow.

4 Claims, 3 Drawing Figures

PATENTED MAY 14 1974  3,810,454

POLLUTION FREE FUEL INLET SYSTEM FOR INTERNAL COMBUSTION ENGINES

BACKGROUND OF THE INVENTION

This invention relates to an internal combustion engine and is particularly concerned with air and fuel inlet means to the combustion chamber which provide a substantially pollution free engine.

As set forth in applicant's U.S. Pat. No. 3,735,740, it was established that a more efficient and complete combustion was accomplished by the injection of auxiliary air into the combustion chamber just prior to combustion. Such auxiliary air in this prior structure was introduced by a forced air system through valve means which automatically opened at a certain time but which otherwise was closed.

While such system operates efficiently for the intended purpose, namely, to provide better engine operation and less pollution, it requires individual valves to direct the one-way flow of fresh air into the combustion chamber. Such valves of course add to the expense of the system and require certain maintenance.

SUMMARY OF THE INVENTION

According to the present invention, an auxiliary air supply system is provided for internal combustion engines which furnishes auxiliary air to the combustion chamber at a critical time by a free flowing arrangement, thus eliminating the use of valve control means and operating means for the valves.

A more particular object of the invention is to provide an auxiliary air supply for internal combustion engines which includes a reed valve mounted between the fuel intake manifold and the combustion chamber and which also includes air intake means located between the reed valve and the combustion chamber arranged to provide for the free flow of auxiliary air, the operation of the reed valve and the auxiliary air intake being automatically functioned by vacuum conditions of the engine.

Another object is to provide a system of the type described which is extremely simplified and which is readily applied to existing engines.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 1:
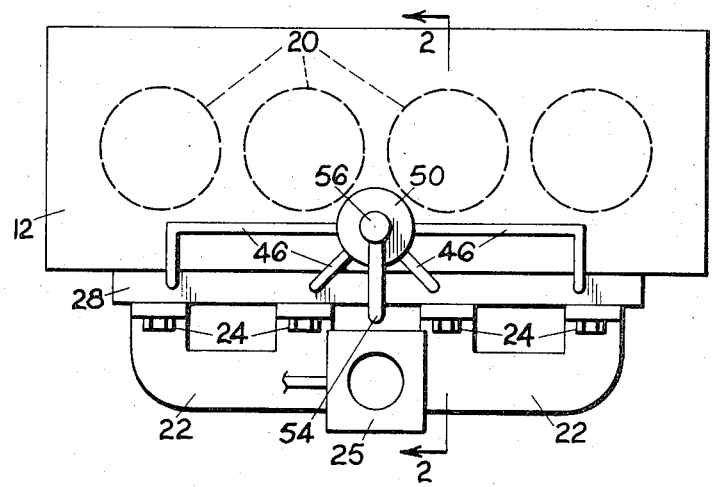
FIG. 1 is a top plan view of an internal combustion engine showing the auxiliary air supply means of the present invention applied thereto.

With particular reference to the drawings, the numeral 10 designates generally an internal combustion engine of conventional construction. Such engine has a head portion 12 with an intake passageway or port 14 leading to a combustion chamber 16. The control of fuel mixture through intake passageway 14 into the combustion chamber is accomplished by an intake valve 18. Combustion chamber 16 is in communication with a cylinder 20 for a piston 21.

An intake manifold 22 of conventional construction is secured to the head 12 as by bolts 24 to provide the inflow of the fuel air mixture into the passageway 14. An air fuel mixture is fed to the manifold by a carburetor 25. Other portions of the engine are not illustrated since such portions are not necessary to an understanding of the invention.

The present system allows one-way flow of the fuel air mixture from the manifold 22 to the intake passageway 14 by means of a reed valve 26. Such a reed valve is mounted between each intake passageway 14 and the intake manifold 22, and in a preferred construction they are supported on an inner surface of a mounting bar or plate 28 secured between the intake manifold and the head 12, as by the bolts 24. Suitable gaskets 30 are provided in this connection.

Figure 3:
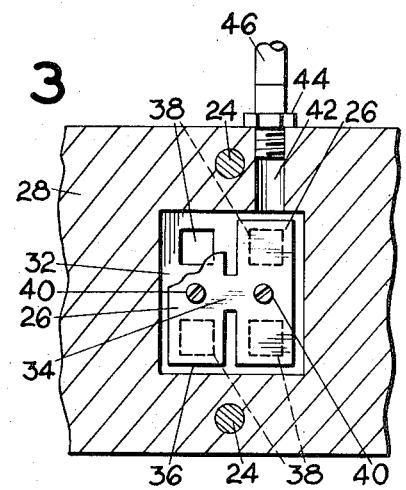
FIG. 3 is a fragmentary sectional view taken on the line 3—3 of FIG. 2.

In a preferred arrangement, the reed valves 26 are mounted in inwardly facing recesses 32 in the mounting bar 28 and comprise a body portion 34, best seen in FIG. 3, having four extensions 36 comprising the reed or flap portions of the valve. These reed portions are associated with respective openings 38 through the bar. The reed valve 26 is secured in place in the recess by a pair of screws 40.

Figure 2:
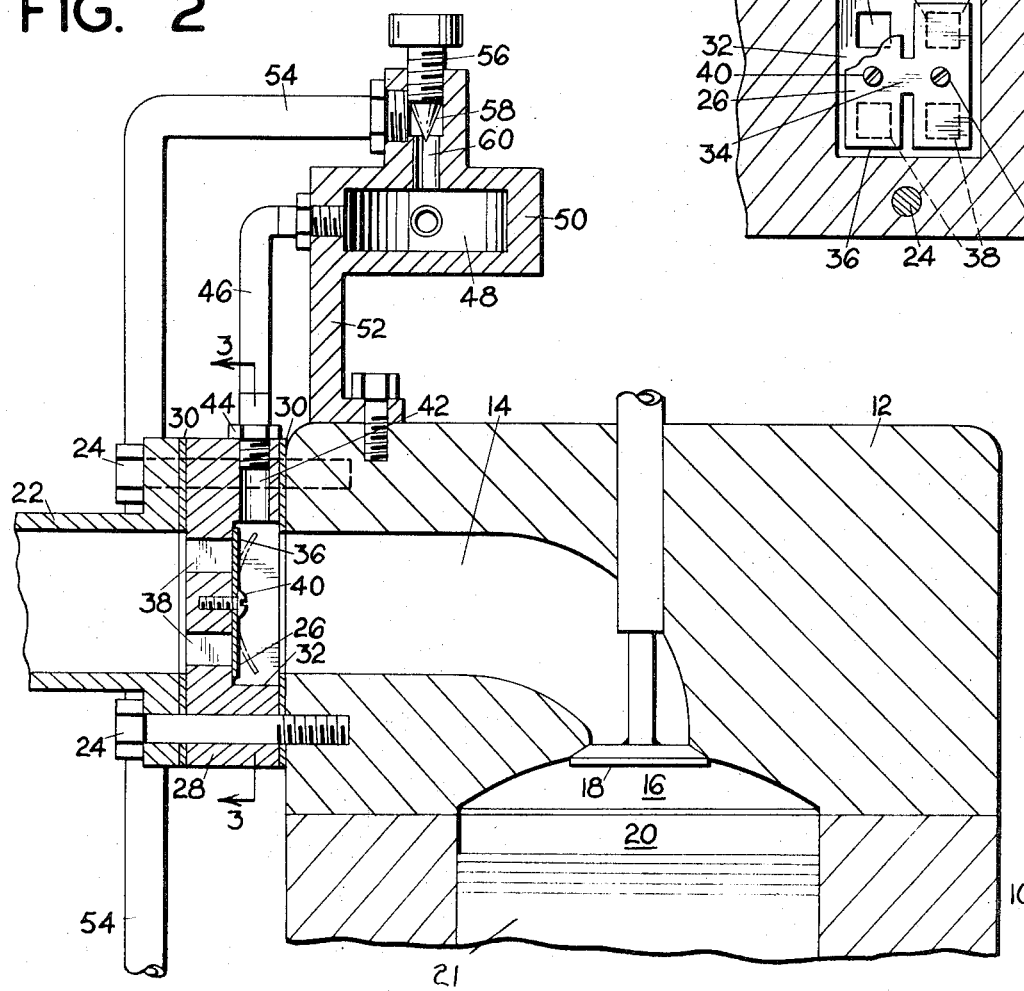
FIG. 2 is a transverse sectional view taken on line 2—2 of FIG. 1.

The arrangement is such that vacuum created in the cylinder 20 will open the reed valve to the phantom line position shown in FIG. 2 and the air fuel mixture will enter from the manifold 22 as in conventional operation. However, once the vacuum influence of the cylinder ceases, the reed valve will close and there will be no backflow.

Leading from each recess 32 in the bar 28 is a port 42 which receives a fitting 44 from a conduit 46. Each of the conduits 46 leads to a central chamber 48 of a valve housing 50. This housing may be secured to the head 12 as by a bracket 52.

Leading into the valve housing 50 is a main inlet conduit 54. The flow of air from conduit 54 into the chamber 48 is controlled by a needle valve 56 threadedly mounted in the housing and having a tapered end portion 58 thereof associated with a port 60. By means of chamber 48, the pressure to all the intake passageways 14 is equalized. The other end of the conduit 54 may lead from any suitable source of air; as for example, it may merely be open to atmosphere, or preferably, it leads from the interior of a valve cover or the crankcase since such will disposed of some undesirable fumes which may develop.

In operation of the engine, auxiliary air is admitted constantly through port 42. More particularly, in the intake stroke, vacuum in the cylinder is greater than the vacuum in the intake manifold and therefore the fuel mixture is drawn in through the reed valve from the manifold. A charge of auxiliary air is of course drawn in through port 42. As the valve 18 closes, the reed valve will also close. Passageway 14 remains under vacuum conditions, however, and additional auxiliary air will still be drawn in through the port 42. Such a vacuum condition in passageway 14 further exists on the compression stroke, the power stroke, and the exhaust stroke since no change in position of valves 18 and 26 occurs in these conditions. With such constant inlet of the air through port 42, it is believed that the charge of auxiliary air which exists downstream from the air fuel mixture furnished by the manifold provides an improved combustion and improved engine operation. While an admixture of auxiliary air with the air fuel mixture normally would lean down the mixture, the theory is that the cooler mixture which is drawn in through the port 42 does not immediately mix with the air fuel mixture from the manifold 22 and is available apart from such mixture to provide a good charge of air for substantially complete combustion.

Another theory deemed to provide the improved operation of the present system is that the reed valve closes as soon as the vacuum in the cylinder ceases. Thus, there will be no backflow of exhaust gases from the combustion chamber or exhaust system into the intake manifold which may result from the influence of other cylinders. There will thus be no dilution of the air fuel mixture, particularly during idling or deceleration. The use of reed valves is very advantageous because they are substantially noiseless and are adaptable to high speed operation.

By the use of the present system, there is a definite reduction in carbon monoxide and unburned hydrocarbons from the exhaust of the engine. In fact, even at idling or loafing conditions, or during deceleration, there is no appreciable discharge of undesirable by-products. This is a substantial improvement over present systems since as is well known at idling, deceleration, or loafing conditions, there generally is considerable by-products of combustion. Also, by means of the present system, engine power is increased at slow speeds and stalling characteristics are improved. All of these advantages are believed to result from the charge of auxiliary air which is admitted in each cycle. The feed of the auxiliary air from the common chamber 48 equalizes the pressure in all the intake passageways 14, as stated, and this equalization provides for better engine operation.

It is to be understood that the form of my invention herein shown and described is to be taken as a preferred example of the same and that various changes in the shape, size and arrangement of parts may be resorted to without departing from the spirit of my invention, or the scope of the subjoined claims. Although the invention is illustrated in combination with a multiple cylinder engine, it is to be understood that it could be used on a single cylinder engine.

Having thus described my invention, I claim:

1. A pollution free fuel inlet system for internal combustion engines having an intake manifold and an intake passageway therefrom leading to a combustion chamber associated with piston and cylinder means, comprising
   a. a one-way valve arranged to be mounted between the intake manifold and the intake passageway allowing flow of air fuel mixture from the intake manifold to the combustion chamber but preventing reverse flow,
   b. an air inlet means arranged to be disposed between said valve and the combustion chamber to allow inflow of auxiliary air,
   c. said air inlet means allowing free unrestricted flow of said auxiliary air therethrough at all times whereby air will be admitted automatically therethrough during those times that a vacuum exists in the intake passageway to provide a charge of air in front of an air-fuel mixture admitted from the intake manifold in an intake step.

2. The fuel inlet system of claim 1 wherein said valve comprises a reed valve.

3. The fuel inlet system of claim 1 including a mounting bar arranged to be secured between the intake manifold and the engine, said valve and air inlet means being mounted on said bar.

4. The fuel inlet system of claim 1 including a mounting bar arranged to be secured between the intake manifold and the engine, means in said mounting bar defining a recess communicating with the combustion chamber, said bar having aperture means therethrough communicating between said recess and the intake manifold, said reed valve being secured in said recess over said aperture means for controlling the one way flow of air fuel mixture from the manifold to the combustion chamber.

* * * * *